United States Patent [19]

Helm

[11] Patent Number: 4,464,744
[45] Date of Patent: Aug. 7, 1984

[54] VIDEO DISC PLAYER HAVING TURNTABLE RETENTION MECHANISM
[75] Inventor: James H. Helm, Elwood, Ind.
[73] Assignee: RCA Corporation, New York, N.Y.
[21] Appl. No.: 461,068
[22] Filed: Jan. 26, 1983
[51] Int. Cl.³ .......................... G11B 3/60; G11B 17/04
[52] U.S. Cl. .................................................... 369/264
[58] Field of Search ...................... 369/264, 269, 77.2, 369/266, 270; 346/137

[56] References Cited
U.S. PATENT DOCUMENTS
4,176,847 12/1979 Akai et al. ............................ 369/266
4,328,575 5/1982 Elliott .................................... 369/269
4,432,086 2/1984 Hughes ................................. 369/269

Primary Examiner—Steven L. Stephan
Attorney, Agent, or Firm—Eugene M. Whitacre; William H. Meise; Dilip A. Kulkarni

[57] ABSTRACT

Both the turntable and the housing of the player are provided with hook-like projections which are brought into alignment whenever the turntable motor is switched off. These projections safeguard against accidental separation of the turntable from the unit, e.g., during handling. For service, the turntable is rotated slightly until the hooks are not in registration, and then the turntable is lifted away from the player.

7 Claims, 5 Drawing Figures

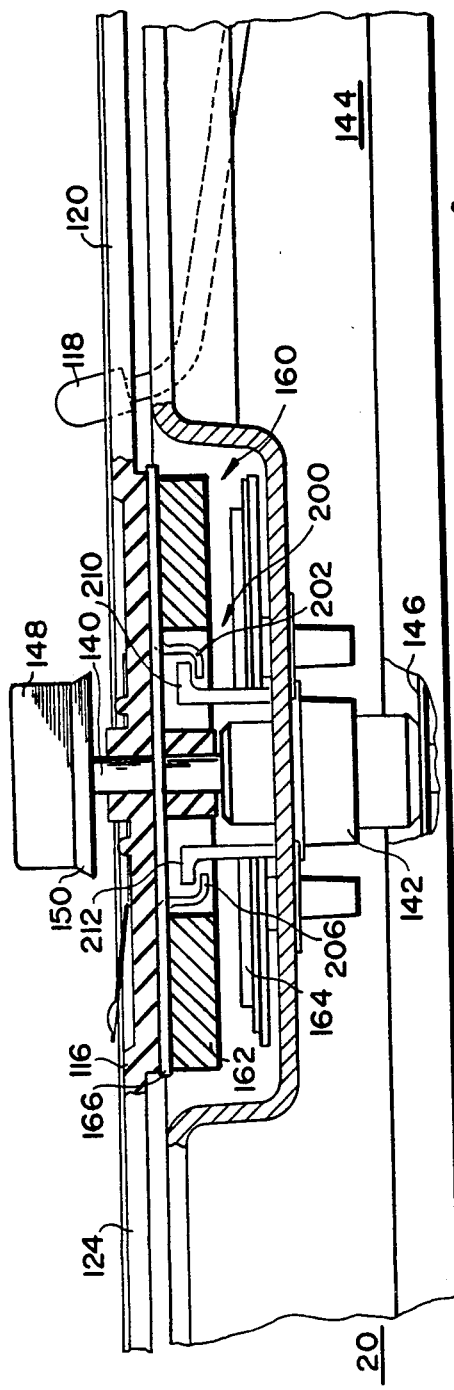
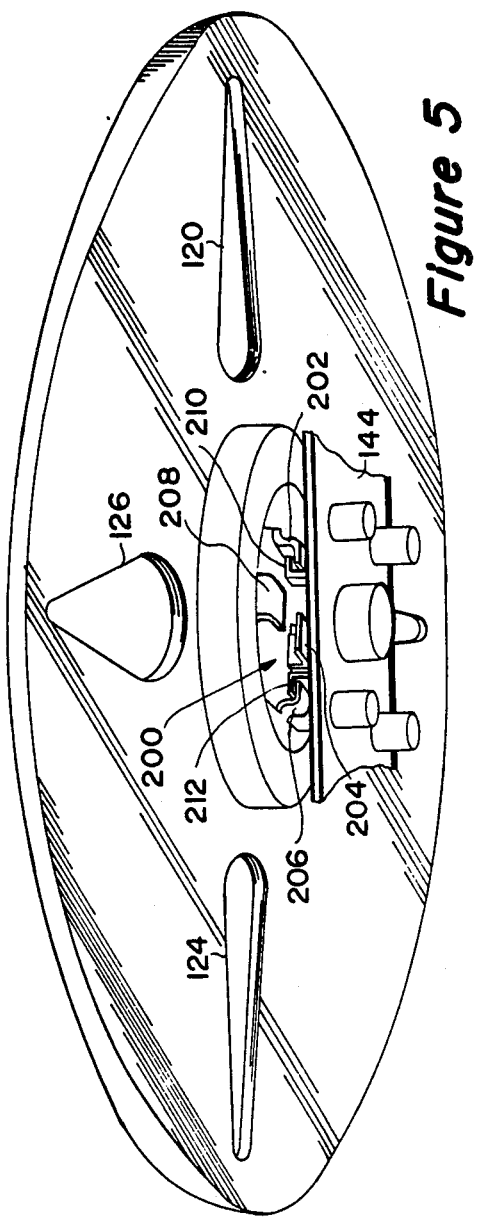

VIDEO DISC PLAYER HAVING TURNTABLE RETENTION MECHANISM

This invention relates to a video disc player, and more particularly, to a device for retaining the record turntable during handling and shipping.

In a capacitance-type video disc system, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

It is beneficial to enclose a video disc in a protective caddy, which comprises a record retaining spine removably located within an outer jacket or sleeve. The record retaining spine has an opening in which a record is received to form a record/spine assembly. For record loading, a full caddy is inserted into an input slot provided in a video disc player. A record extracting mechanism disposed in the player removes the record/spine assembly from the caddy during subsequent jacket withdrawal, whereby the record is retained in the player resting on a set of record receiving pads. The retained record is then transferred to the turntable for playback. For record retrieval, the record is transferred back to the receiving pads, and an empty jacket is reinserted into the player to recapture the record/spine assembly.

In U.S. patent application of Hughes, Ser. No. 374,377, a record handling mechanism is described for selectively transferring a retained record between the turntable and the record receiving pads. The Hughes mechanism includes a record lifting finger which protrudes through one of the slots in the turntable to lift a record resting on the record receiving pads disposed above the turntable. The record lifting finger drives the record against a pair of stops located above the pads, and the pads are retracted out of the way. The record lifting finger is then lowered to a position beneath the turntable to gently lower the record onto the turntable for playback.

The sequence of operations is reversed to transfer the record back to the record supporting pads. The record lifting finger is raised to elevate a turntable-supported record to a position against the stops above the receiving pads. The record supporting pads are advanced, and the record lifting finger is then withdrawn to achieve the transfer of the record back to the pads. An empty record sleeve is reinserted into the player to retrieve the record/spine assembly.

The video disc player is equipped with a mechanism for stopping the turntable at an angular position such that one of the turntable slots is over the record lifting finger to allow it to pass through, so that the record can be transferred to and from the receiving pads.

The player of the type described above needs a mechanism for retaining the turntable in the player in the event the unit is inadvertently inverted during handling and shipping. On the other hand, the turntable retaining mechanism needs to be easily disengageable in order to allow the separation of the turntable from the player for serviceability.

In accordance with this invention, both the turntable and the player housing are provided with a set of hook-like projections which are aligned any time the turntable drive motor is switched off. In this mode, the record transfer rod is up through one of the turntable holes to limit the rotation of the turntable. When the turntable is held in this fashion, the aligned sets of hook-like projections prevent accidental removal of the turntable from the unit.

To release the turntable for serviceability, for instance, the record transfer rod is lowered to a level beneath the turntable. The turntable is rotated slightly to arrange the two sets of hook-like projections out of alignment, and the turntable is then lifted away from the player to cause separation.

In the Drawings:

FIG. 4 depicts a cross-sectional view of the video disc player of FIGS. 1 and 3 showing certain details of the subject turntable retention system; and FIG. 5 shows a bottom isometric view of the turntable assembly.

Figure 1:
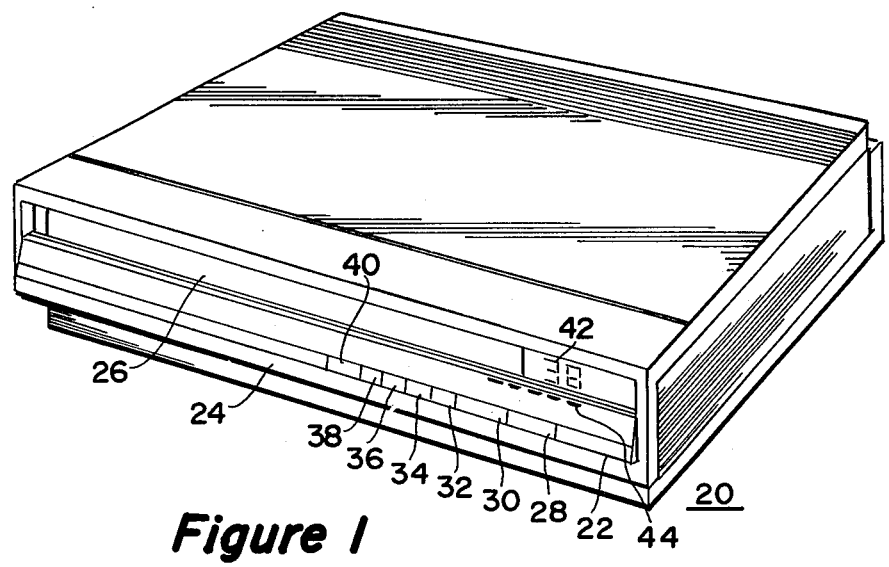
FIG. 1 is a perspective view of a video disc player having the turntable retention mechanism of the present invention.

Shown in FIG. 1 is a video disc player 20 incorporating the present turntable retention mechanism. To play a disc, the player is turned on by pressing the POWER botton 22 located on the front panel 24. A full record caddy is inserted into the player through a caddy input slot 26, and the empty caddy sleeve is then extracted therefrom leaving the enclosed record/spine assembly inside the player. The record is automatically deposited on the turntable, and played back through a conventional television receiver. At any point during playback, the viewer can reject the remainder of the record by depressing the REJECT button 28, or interrupt the program by activating the PAUSE button 30. In the PAUSE mode, the pickup stylus is raised, and its lateral motion is arrested. When the PAUSE button 30 is operated again, the stylus is lowered and the playback is resumed. A set of pushbuttons 32, 34, 36 and 38 are arranged on the instrument panel 24 to dispose the player in any one of four search modes—i.e., visual search (forward/reverse) and rapid access (forward/reverse)—to enable the viewer to quickly locate a precise section of the prerecorded program. In visual search, the stylus is rapidly moved across the record (16X) while in engagement therewith. In rapid access, the stylus is swept across the record at a much greater speed (120X) while the stylus is down. The player has a CHANNEL A/B button 40 to select any one of two audio channels in the event of a bilingual program disc. An LED indicator 42 shows the elapsed playing time. Various player functions—such as SIDE 1-2, CHANNEL A/B, STEREO—are indicated by a plurality of light indicators 44.

Figure 2:
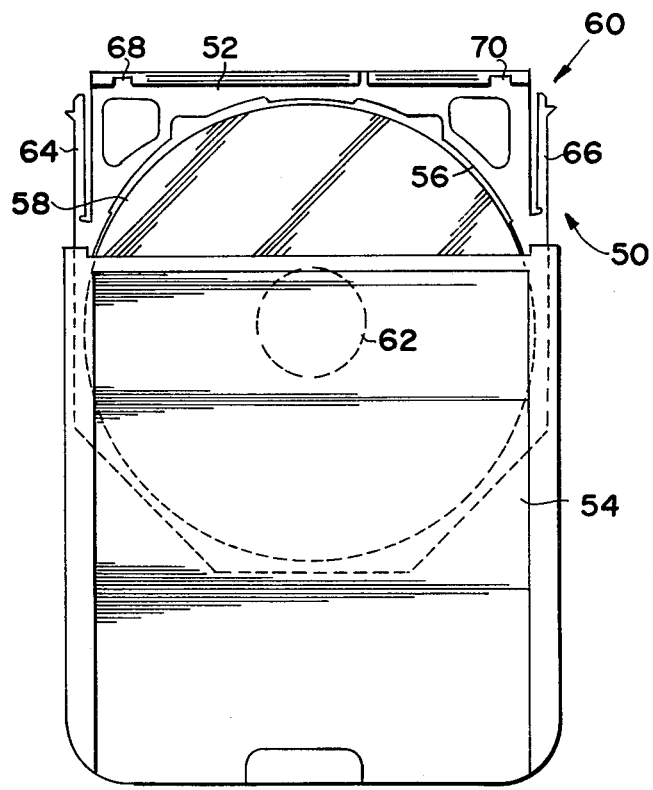
FIG. 2 is a video disc caddy suitable for use with the video disc player of FIG. 1.

The caddy 50, depicted in FIG. 2, consists of a planar record retaining spine 52 removably enclosed in a flat outer sleeve 54. The retaining spine 52 has an opening 56 in which a centrally-apertured record 58 is received forming a record/spine assembly 60. The numeral 62 denotes the record center hole. Integrally molded with the spine 52 are spine latch fingers 64 and 66 for releasably securing the spine 52 in its sleeve 54. The spine 52 has cutouts 68 and 70 in which the respective spine gripper members of the player are received to secure the spine to the player for reasons explained later.

Figure 3:
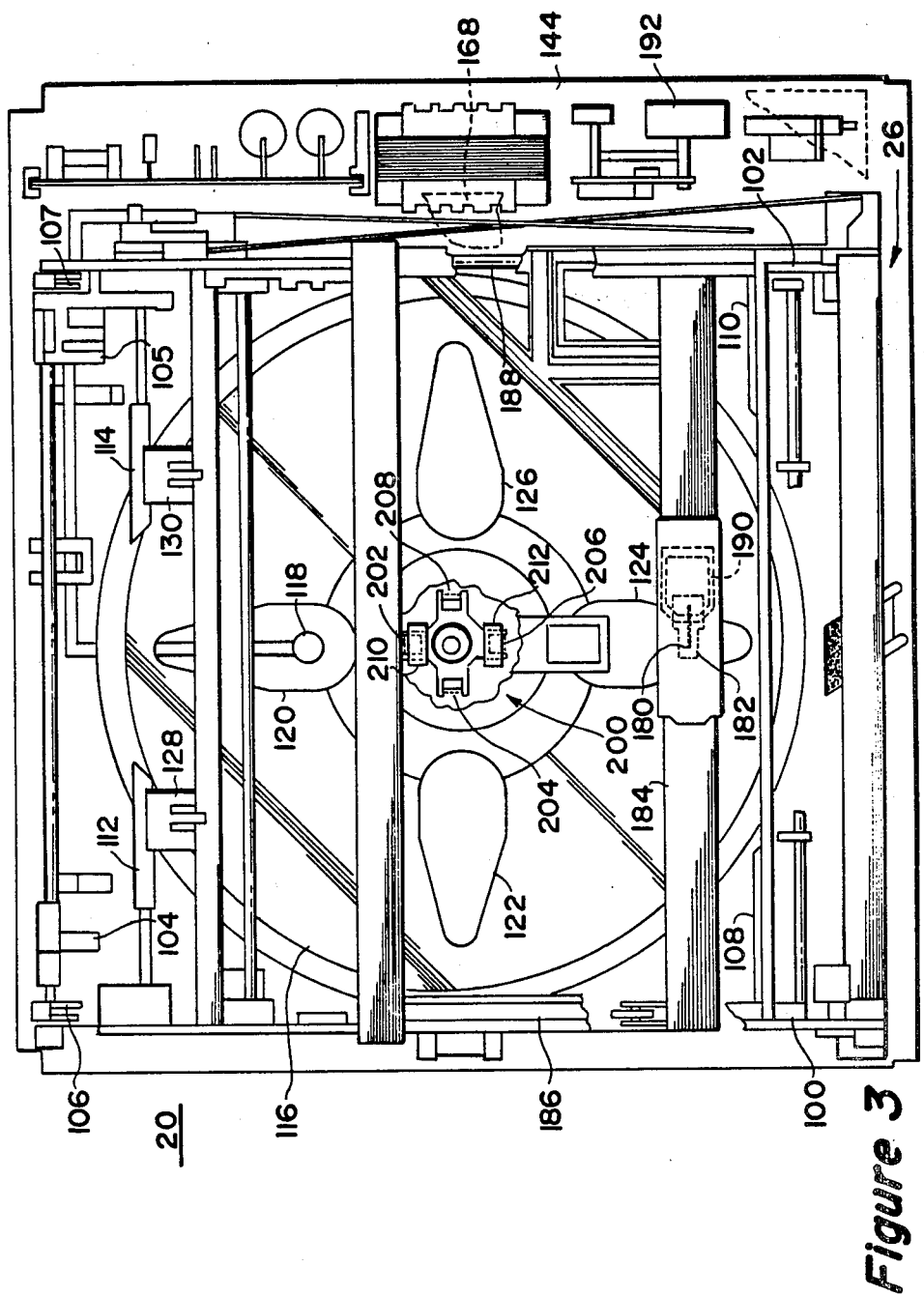
FIG. 3 illustrates a top view of the FIG. 1 video disc player with its cover removed to show the underlying details.

To load a record, a full caddy 50 is inserted into the player through the input slot 26 along the guide tracks 100 and 102 depicted in FIG. 3. A pair of spine latch members 104 and 105 engage the cutouts 68 and 70 in the spine 52 to lock it to the player upon a full insertion of the caddy 50 into the player. Simultaneously, a pair of latch defeat fingers 106 and 107 enter into the jacket 54 to defeat the spine latch fingers 64 and 66 to free the spine 52 from the jacket. The empty jacket 54 is then withdrawn to leave the enclosed record/spine assembly resting on a set of retractable record receiving pads 108, 110, 112 and 114.

To transfer the retained record 58 to a turntable 116, a record transfer rod 118 is raised through one of the four holes 120, 122, 124 and 126 in the turntable to drive the record up against a pair of stops 128 and 130. The record receiving pads 108, 110, 112 and 114 are then retracted out of the way, and the record transfer rod 118 is gently lowered to a level below the turntable 116 to cause the record 58 to deposit on the turntable.

As shown in FIG. 4, the turntable 116 is fixedly mounted on a central shaft 140, which is received in a bearing 142 firmly secured to the centerplate 144 of the player. The centerplate 144 can be made from any suitable material—such as plastic. The lower end of the turntable shaft 140 rests on a thrust bearing 146.

The turntable shaft 140 is fitted with a record centering spindle 148. The centering spindle 148 has a flared portion 150 which engages the center hole 62 of the record 58 placed on the turntable 116 to center it.

To drive the turntable 116, the player employs a brushless DC motor 160 located underneath the turntable. The turntable drive motor 160 comprises a ring-shaped magnetic rotor 162 and a stator 164 mounted to the player centerplate 144. The motor rotor 162 includes a plurality of successive alternating north and south poles (e.g., 4 pairs) arranged symmetrically around the rotor ring. The ring-shaped rotor magnet 162 is attached to a circular, magnetic flux plate 166, which is fixedly riveted to the underside of the turntable 116. The flux plate 166 can be made from any suitable material, such as steel.

The stator 164 consists of a set of four coils arranged symmetrically relative to the axis of the turntable rotation. The oppositely disposed coils are serially connected. A microcomputer 168 provides appropriate signals for application to the stator coils in a manner causing the turntable 116 to rotate at the desired speed during playback (e.g., 450 rpm). The operation of the turntable drive motor 160 is disclosed in detail in a commonly-assigned U.S. patent application, Ser. No. 405,441, of Kelleher et al.

A pickup stylus 180 is housed in a protective cartridge 182, which, in turn, is located in a slidable carriage 184. The carriage 184 is translatably mounted for a front-to-back motion along a pair of guide rails 186 and 188. A stylus lifter 190, disposed in the carriage 184, gradually lowers the stylus 180 onto the record 58 resting on the turntable 116. During playback, a microcomputer-controlled DC stepper motor 192 drives the carriage 184 so as to cause it to follow the radially inward motion of the pickup stylus 180.

Following playback, the turntable drive motor 160 is switched off, and the carriage 184 is returned to its off-record home position. The microcomputer 168 ensures that one of the four turntable slots 120, 122, 124 and 126 is over the record lifting finger 118 when the turntable drive motor 160 is turned off. The details of how the turntable 116 is stopped at one of the four angular positions are given in the afore-mentioned Kelleher et al. patent application.

To transfer the turntable-supported record 58 to the receiving pads 108, 110, 112 and 114 to form the record/spine assembly 60, the record transfer rod 118 is raised through the opening 120 in the turntable 116 to lift the record to the position against the stops 128 and 130, the receiving pads are moved back in place, and the record transfer rod 118 is lowered to an intermediate position (below the pads but above the turntable). An empty jacket 54 is reinserted into the player to retrieve the record/spine assembly 60. The record transfer mechanism is described in detail in the aforesaid Hughes patent application.

As previously-indicated, it is desirable to secure the turntable 116 to the player to safeguard against inadvertent separation thereof during transit. To this end, the player is equipped with a turntable retention mechanism 200, shown in FIGS. 4 and 5, in accordance with this invention. The subject mechanism 200 not only secures the turntable 116 to the player without interfering with the rotation thereof, but is also easily disengageable for serviceability.

The turntable retention mechanism 200 comprises a set of four downwardly-depending, hook-like projections 202, 204, 206 and 208 integrally-provided on the circular flux plate 166 staked to the undersurface of the turntable 116. The hook-like projections 202, 204, 206 and 208 are spaced 90 degrees apart relative to the turntable shaft 140 such that they are aligned with the respective slots 120, 122, 124 and 126 in the turntable 116. A second set of hook-like projections 210 and 212 are integrally molded with the centerplate 144 toward the front and the back of the player. Any time the turntable 116 is brought to rest, the hook-like projections 210 and 212 on the centerplate 144 are aligned with respect to the appropriate ones of the hook-like projections 202, 204, 206 and 208 on the turntable. The hook-like projections 202-212 are dimensioned such that they do not interfere with the turntable rotation as can be seen from FIG. 4. As long as the player remains in the OFF mode, the record lifting finger 118 occupies one of the turntable holes 120, 122, 124 and 126 to limit the rotation of the turntable 116 (e.g., ±15 degrees). When the turntable 116 is held in this manner, the respective hook-like projections 202-212 are in registration, so that the turntable cannot move away from the centerplate 144 more than the clearance between the hooks.

For service, it is only necessary to lower the transfer rod 118, rotate the turntable 116 so that the hooks are out of alignment (e.g., 20-25 degrees), and then lift the turntable out of the centerplate 144.

The subject turntable retention mechanism is relatively simple, inexpensive, protects the turntable during handling and shipping, and provides for easy disengagement for serviceability.

What is claimed is:

1. In a disc record player for recovering prerecorded signals from a disc record supported on a turntable rotatably mounted to the housing of said player; said player having means for driving said turntable; said player further including a mechanism for stopping said turntable at a certain angular position when said turntable driving means is switched off; said player further having a mechanism for holding said turntable at said angular position while said player remains turned off; turntable retaining apparatus comprising:

a retaining element fixedly attached to said turntable; and a further retaining element securely mounted to said housing such that said retaining elements are in alignment when said turntable is occupying said angular position; said retaining elements being subject to engagement with each other to prevent removal of said turntable from said housing when said turntable is raised while said elements are in alignment.

2. The turntable retaining apparatus as set forth in claim 1 wherein said turntable stopping mechanism stops said turntable at one of a plurality of angular positions when said turntable driving means is turned off; wherein said turntable has the same plurality of retaining elements; said turntable retaining elements being arranged such that said retaining element mounted to said housing is in registration with one of said turntable retaining elements when said turntable is stopped to prevent separation of said turntable from said housing when said player is switched off.

3. The turntable retaining apparatus of claim 2 wherein said plurality of turntable retaining elements comprises two sets of retaining fingers disposed diametrically opposite with respect to each other.

4. The turntable retaining apparatus as defined in claim 3 wherein said sets of retaining fingers are disposed at right angles to each other.

5. The turntable retaining apparatus of claim 4 wherein a pair of retaining members are fixedly mounted to said housing on the opposite sides of the axis of rotation of said turntable, and are adapted for engagement with the respective ones of said retaining fingers to prevent removal of said turntable, when said turntable is occupying one of said angular positions and said turntable is raised.

6. The turntable retaining apparatus as set forth in claim 5 wherein said retaining fingers depend downwardly from the underside of said turntable; wherein said retaining members extend upwardly from the interior surface of said housing; wherein said retaining elements have hook-like end portions subject to engagement with each other to prevent removal of said turntable, when said turntable is raised while occupying one of said angular positions.

7. The turntable retaining apparatus as defined in claim 6 wherein said turntable angular position holding mechanism comprises a record transfer element which extends through one of a corresponding plurality of holes provided in said turntable; said record transfer element occupying one of said turntable holes when said player is turned off to prevent rotation of said turntable.

* * * * *